UNITED STATES PATENT OFFICE.

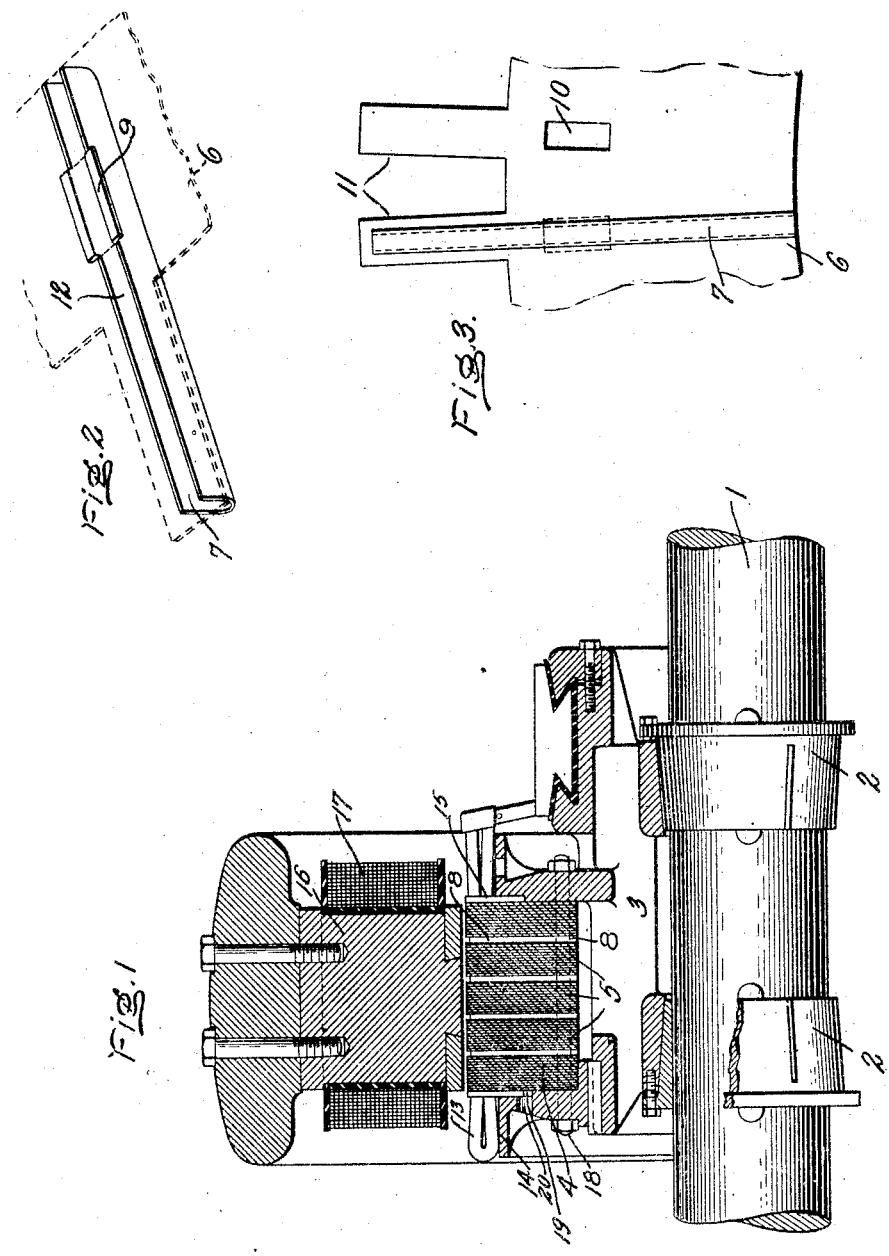

JOHN P. MALLETT, OF MADISON, WISCONSIN, ASSIGNOR TO GENERAL ELECTRIC COMPANY, A CORPORATION OF NEW YORK.

CORE-SEPARATOR.

No. 850,116.          Specification of Letters Patent.          Patented April 9, 1907.

Application filed August 1, 1905. Serial No. 272,200.

*To all whom it may concern:*

Be it known that I, JOHN P. MALLETT, a citizen of the United States, residing at Madison, county of Dane, State of Wisconsin, have invented certain new and useful Improvements in Core-Separators, of which the following is a specification.

My present invention has for its object improvements in the construction and arrangement of the spacers or separators used for forming ventilating-ducts in electrical apparatus, particularly adapted for use with laminated magnetic cores for the purpose of forming ventilating-ducts by separating sections of the laminated cores, and generally for supporting the toothed portions of laminated cores.

The various features of novelty which characterize my invention are pointed out with particularity in the claims annexed to and forming a part of this specification.

For a better understanding of my invention, however, reference may be had to the accompanying drawings and descriptive matter, in which I have illustrated and described one of the forms in which my invention may be embodied.

Of the drawings, Figure 1 is a sectional elevation of a portion of a dynamo-electric machine. Fig. 2 is a perspective view of my space-block or separator with a portion of the lamina to which it is attached shown in dotted lines, and Fig. 3 is an elevation of a portion of a lamina with attached separator or space-block.

In the form of my invention disclosed I have shown it employed in the armature of a direct-current dynamo-electric machine.

Referring to the drawings, 1 represents the shaft of a dynamo-electric machine to which is secured in any suitable manner, as by means of cones 2, a spider 3, which supports in any well-known manner the laminated armature-core 4. As shown, the armature-core comprises sections 5, formed of laminæ 6 of magnetic material which are separated from each other by spacers, separators, or fingers 7 to form radially-extending ventilating-passages 8, each of said passages being formed by adjacent sections 5 and adjacent separators 7.

The spacers or separators which I employ are in the form of troughs U-shaped in cross-section, formed out of sheet metal. From each of the two similar long edges of each trough-shaped separator 7 extends a projection 9. The lamina 6 of each section 5, to which these spacers are attached, is formed with a set of rectangular openings 10, which are symmetrically placed, preferably one below the base of each core-tooth 11. The projections 9 of each separator pass through the corresponding opening 10 in the lamina 6, to which it is attached. These projections 9 are upset, as shown in Fig. 2, and form a means for rigidly securing the separator to the lamina. Ordinarily the projections 9 are upset after being inserted through the corresponding openings 10. The parts are preferably so proportioned that the sides of the separator require a slight amount of compression to allow of the entrance of the projections of the spacer into the opening 10, in consequence of which the spacers are held by friction in the laminæ after having been inserted prior to being upset. This facilitates the assembling of the spacers.

As is clearly shown in Fig. 3, the spacers extend from the inner edge of the core to a point at or near the outer end of the corresponding tooth 11. When the core is assembled, ventilating-passages 8 are not only formed between adjacent sections in the spaces between spacers, but a ventilating-passage 12 is formed within each spacer which extends from the inner surface of the core to the end of the corresponding core-tooth. The passage of air through the passages 12 assists considerably in conveying heat away from the armature-conductors 13, which are placed in the slots between adjacent core-teeth 11. The structure of the spacers or fingers 7 and 15 is such that when the core is compressed between the end members 14 by bolts 18 there is no tendency of the spacers to turn at an angle to the lamina to which they are secured.

It will of course be understood that the air-currents through the ventilating-passages 8 and 12 when the armature is rotated not only cool the armature, but cool the surrounding pole-pieces 16 and windings 17 therefor.

Between each end member 14 and the adjacent end of the core may be inserted a set of spacers or fingers 15, which may be similar in construction and the manner of their connection to the end laminæ of the core to the spacers or separators 7, though ordinarily the spacers 15 do not extend to the inner surface of the core. The spacers or fingers 15 serve to support the toothed portions of the end laminæ and prevent their distortion. Means may be provided, if necessary or desirable, for causing ventilating air-currents to flow through the fingers 15 and through the spaces between the ends of the core and the adjacent end members.

In the construction illustrated in the drawings I have shown the inner ends of fingers or separators 15 as entering into annular ventilating-channels 19, formed in the end members. Lateral passages 20, passing through the end members 14, communicate with the channel 19. The outward flow of air from the channels 19 serves to cool the end connections of the windings in a manner well known to those skilled in the art.

The construction which I have hereinbefore described and illustrated is simple and comparatively inexpensive to manufacture and has been found to be reliable by commercial use on a large scale.

What I claim as new, and desire to secure by Letters Patent of the United States, is—

1. In combination, a laminated core divided into sections, and separators between the sections consisting of pieces of sheet metal bent into the form of troughs open at each end.

2. In a dynamo-electric machine, an annular core, formed of laminated magnetic material divided into sections, and radially-extending spacers or separators placed between the sections and bearing against the laminæ, each spacer having a ventilating-passage formed in it.

3. In a dynamo-electric machine, an annular core formed of laminæ divided into sections, and a spacer or separator located between the sections extending from a point adjacent the inner edge of the core to a point adjacent the periphery of the core, said spacer having a ventilating-passage formed in it.

4. In a dynamo-electric machine, an annular core formed of laminated material divided into sections and having conductor-receiving slots separated by teeth formed at its periphery, and separators or spacers between the sections extending from a point adjacent the inner surface of the core to the peripheries of the teeth, said separators having ventilating-passages formed in them.

5. In combination, a core-lamina formed with an opening in it, a separator member, and means for securing it to said lamina comprising two projections side by side each of which enters said opening.

6. In combination, a core-lamina formed with an opening in it, a separator member, and means for securing it to said lamina comprising two projections side by side each of which enters said opening and is upset.

7. In combination, a core-lamina formed with an opening in it, a separator member, and means for securing it to said lamina comprising two projections side by side each entering said opening, the parts being so proportioned that the projections must be sprung together to allow of their insertion in said opening.

8. In combination, a lamina, and fingers secured thereto, each finger being in the form of a trough open at each end, the top edges of which bear against said lamina.

9. In combination, a core-laminæ, and a plurality of fingers secured thereto, each finger being in the form of a trough-shaped piece of metal U-shaped in cross-section with the ends of the U bearing against said laminæ, both ends of each trough being open.

In witness whereof I have hereunto set my hand this 28th day of July, 1905.

JOHN P. MALLETT.

Witnesses:
 H. L. MORRIS,
 S. E. KENDALL.